Feb. 23, 1954

H. ZIEGLER 2,669,874

FLUID FLOW METERING AND INTEGRATING INSTRUMENTS
AND THE LIKE, WITH ZERO STABILIZER
Filed Oct. 17, 1950

INVENTOR

Horst Ziegler

BY

F. D. Prager
Atty.

Patented Feb. 23, 1954

2,669,874

UNITED STATES PATENT OFFICE 2,669,874

FLUID FLOW METERING AND INTEGRATING INSTRUMENT AND THE LIKE, WITH ZERO STABILIZER

Horst Ziegler, Berlin, Germany, assignor to Askania-Werke A.-G., a corporation of Germany Application October 17, 1950, Serial No. 190,454

Claims priority, application Germany October 29, 1949

3 Claims. (Cl. 73—206)

My invention relates to meter-integrators for volumes of fluid flow and the like. It has particular reference to a meter-integrator of the type which measures differential pressure, compensating it by an electrodynamic force, and operating accordingly, with forces proportional to the square of the volume to be metered. Such instruments have been subject to uncertainty and lack of stability of the metering result in the zero region.

I have eliminated this lack of stability by the addition of a small, simple, inexpensive, practically indestructible permanent magnet to the measuring and transmitting instrument.

It has further occurred to me that the zero-stabilizing magnet of my transmitter when suitably proportioned and arranged, solves a separate, important problem of the metering and integrating receiver; that is, it compensates the inherent, unavoidable error which is due to the starting friction of a meter-integrator.

This invention is an improvement over that disclosed in the copending application of G. Wuensch, Serial No. 190,453, filed October 17, 1950, wherein a transmitting instrument is described in greater detail. However the present improvement can also be used in other transmitting instruments, for instance in several of those disclosed in the earlier Patent No. 2,319,363 of G. Wuensch et al.

Figure 1:
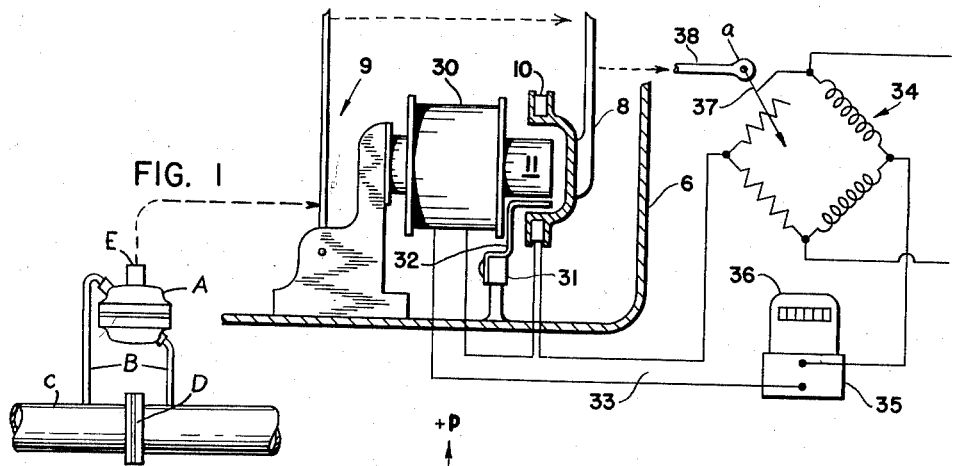
Figure 2:
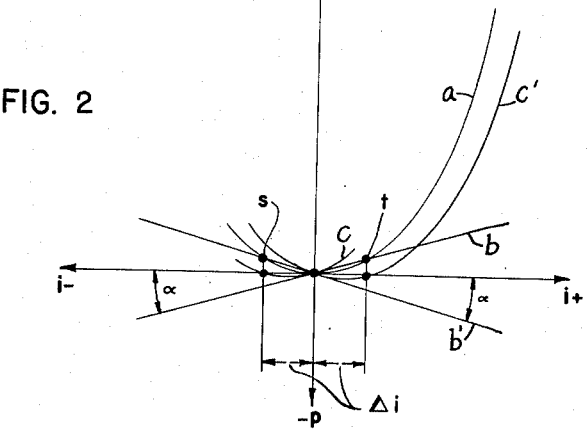
Figure 3:
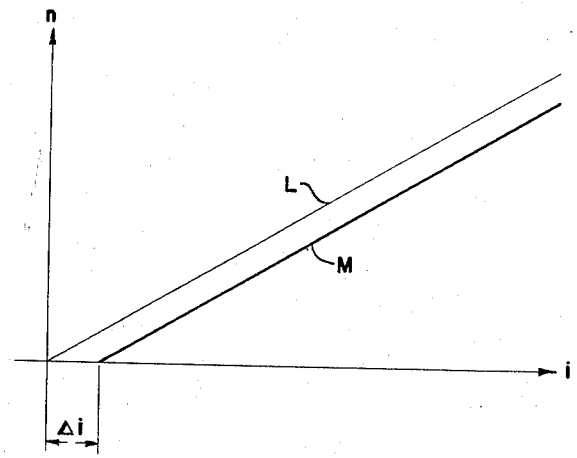

The invention will be understood upon consideration of a typical embodiment described hereinafter and further explained by the drawing appended hereto. In this drawing, Figure 1 illustrates schematically a preferred form of apparatus hereunder. Figure 2 is a diagram of force relationships in the transmitter and Figure 3 is a diagram of operating characteristics of the receiver.

A fluid flow conduit C has interposed thereon a means D to derive a pressure differential from the flow; for instance an orifice plate as shown. The fluid pressure differential is converted into a mechanical force proportional therewith, by an actuator A connected with the conduit by tubes B; for instance by a diaphragm device as shown.

The transmitter housing 6 comprises a compensating lever 8 actuated in well-known manner through linkage 9 from the movable member E of the differential pressure-responsive element A. For differential-compensating purposes lever 8 carries a movable coil 10, forming part of an electrodynamic system. This system also has a stationary core 11 and a fixed coil 30 around the core, in series with the movable coil 10.

I install a small permanent magnet 31 in the transmitter housing 6, in magnetic circuit with the movable coil 10 when this coil is energized. I prefer to locate the magnet 31 adjacent the coil 10 and to provide it with a pole shoe 32—often a mere wire—extending into the coil 10 but avoiding contact therewith.

The electrodynamic system 10, 30 forms part of the diagonal 33 of a Wheatstone bridge 34. It is in series with an electric meter 35, of the ampere hour type, actuating the integrator 36. The bridge comprises a rheostat 37 adjustable by suitable linkage or other means 38 governed by lever 8. For details, I refer to said copending application.

In operation a variable quantity $Q$ of a fluid passes the pressure differential-deriving device D during a unit of time. A suitable current usually direct or pulsating, passes through the bridge. It may also be an alternating current if the diagonal is provided with a rectifier. The differential pressure derived from the fluid flow tends to move lever 8 to one side with a force proportional to $Q^2$. As this movement takes place it produces a shifting of rheostat 37 by linkage 38, establishing an electric current of gradually rising density $i$ in the diagonal 33 of bridge 34. This current produces a compensating force $p$ proportional to $i^2$ in the electrodynamic system 10, 30. The movement of lever 8 stops when $i^2$ has risen to the point where the moment of $p$ on lever 8 balances the moment of $Q^2$. That is, the instrument 6 keeps $i^2$ proportional to $Q^2$ and therefore $i$ proportional to $Q$. The rotor of an electric meter 35 rotates at a speed proportional with $i$. Accordingly this speed is directly proportional to $Q$, and the integrator 36 meters, in effect, the fluid flow.

This operation can be represented by curve $a$ in Figure 2, a parabola representing the formula $i^2=p$. The entire operation can be made very accurate; and its representation by a true parabola $a$ can be very adequate, in general.

There is one limitation to such accuracy, inherent in the parabolic relationship. That is, near the zero value of $Q$, the parabola $a$ is asymptotic to coordinate $i$. In this region minute changes of $p$ produce relatively major changes of $i$. In other words, very low values of $Q$ cannot be measured with full accuracy. Various influences, such as unavoidable although small vibrations of lever 8 or 38, will tend to temporarily distort the measurement; and such distortion becomes relatively serious when $Q$ approaches zero. At such times the direction of current flowing in the bridge diagonal 33 and meter 35 is reversed; and a similar reversal occurs for instance pursuant to a rapid and substantial measurement impulse taking place in the zero region, which causes the lever 38 to swing slightly beyond the new theoretical measurement value due to mass inertia. Still another reason for current reversal may arise in the electrical system, which may utilize a resilient type of resistor instead of the conventional rheostat means 37; see for instance said copending application Ser. No. 190,453 at 23. In any such case reversals of the current in the bridge diagonal are apt to occur due to the elastic oscillations taking place in the direct vicinity of the zero point. Such reversals would not seriously affect the accuracy of integrator 36 if they could be metered correctly, that is as negative values. This, however, is not the case since the power of a current is independent of direction. Therefore, the zero position of lever 8 tends to be unstable, and the measurement at 36 tends to be inaccurate when fluid flows are close to zero for appreciable times. Such measurement actually is inaccurate in instruments known to the art.

The magnet and pole shoe 31, 32 reduce and practically eliminate such inaccuracy. Their constant flux, cooperating with a part of the variable flux of the movable coil 10, superimposes an auxiliary force upon the basic force shown by parabola $a$. The auxiliary force is represented by line $b$ passing through the $i$-coordinate at zero point at an angle $a$ and intersecting parabola $a$ at a point $t$ in the first quadrant. The magnet 31, 32 can be so selected that the parabolic line from $t$ to the zero point substantially coincides with the zone of poor stability for lever 8. The proper location of $t$ can be determined by simple tests. Figure 2 exagerates the extent of the unstable zone, the relative magnitude of the auxiliary magnetic forces and the inclination $a$ of line $b$ in the interest of readability.

Line $b$ stands for an auxiliary magnetic force acting on lever 8 in the same (positive) direction as does the principal compensating force of magnets 19, 30. In other words, both magnets 30, 31 are here assumed to have poles of the same denomination, for instant north poles, opposite the coil 10. However it is also possible to arrange magnets 30, 31 with poles of opposite denomination opposite the coil 10; for instance by reversal of magnet 31 or of diagonal 33. This results in an auxiliary magnetic force represented by line $b'$, which intersects parabola $a$ at a point $s$ in the second quadrant, having the same distance from the vertex of the parabola as does the point $t$. In the case of a positive magnetic force the total compensating force acting on lever 8 equals the sum $c = a + b$. In the case of a negative magnetic force it equals $a - b$ or the sum $c' = a + b'$. The value $c'$ is represented by a curve passing the $i$ axis at a definite angle, instead of approaching it asymptotically. This greatly stabilizes the values of $i$ in the danger zone near the zero point for $Q^2$.

In other words, a small current flows in diagonal 33 even when $p$ and $Q^2$ drop to zero.

Theoretically this would seem undesirable since it seems to distort the current impulse of the transmitter instrument 6. Actually I prefer this variant. My reason is that, upon proper selection of magnet 31, 32 I can produce a characteristic line $c'$ which are zero value for $p$ involves a current value $\Delta i$, as large as the current equivalent $\Delta i$ of the starting friction in meter integrator 35, 36. This value is shown in Figure 3.

It is known that current meter-integrators have a starting error due to the friction of gears and other parts. Such an instrument theoretically operates according to a characteristic line L expressing a certain ratio of meter revolutions $n$ to current values $i$. Actually most meter integrators operate according to a line M which runs parallel with L and is displaced in the direction $i$, by the value $\Delta i$ of the initial, frictional meter error. This error can be minimized to some extent by the use of special materials and excellent workmanship in the making of the meter and integrator, or by the use of electronic integrators. In either case it is hard and very expensive to reduce this error substantially below a value such as 1% of the capacity current for the meter. It is much easier and cheaper to keep the sum total of all errors in the present type of transmitter 6, including the electric controls, to a value far below a tolerance of plus or minus ½%.

It will now be understood that magnet 31, 32 not only stabilizes the zero position of lever 8, making the transmitter 6 more useful, but also improves the receiving meter-integrator 35, 36 making it considerably more accurate. It provides this latter improvement without extra expense, while similar improvements can practically not be achieved by a meter-integrator mechanism at all, and can be achieved only at a prohibitive cost by electronic meter-integrators.

I claim:

1. In a metering system using a condition responsive actuator yielding a force proportional to the square of the condition to be metered, such as a differential pressure type flow metering system, a square root extracting and zero stabilising transmitter, comprising an electrodynamic system of at least one stationary coil and a cooperating core and a least one movable coil; a circuit including said coils and connected to control a remote meter integrator of the ampere hour type; a variable resistor connected to control the circuit; a movable part connected to be moved by and in response to the square-proportional forces applied thereto by the actuator and oppositely directed forces applied by the electrodynamic system, the movable part also being connected to vary the resistor and thereby to balance itself; and a small stationary magnet, having a pole adjacent the core of the stationary coil and facing the movable coil, so that when a zero force is applied by the actuator to the movable part, that part is balanced by the mutually opposed effects of (1) the mechanical force of the magnetic circuit between the small magnet and movable coil and (2) the mechanical force produced in the electrodynamic system by a small electric current flowing through the same.

2. Apparatus as described in claim 1, wherein the small stationary magnet is a permanent magnet mounted adjacent the electrodynamic system and having a pole shoe extending from adjacent the stationary coil into the movable coil.

3. Apparatus as described in claim 2, wherein said pole shoe has magnetic polarity opposite to that of the adjacent stationary coil, whereby the small electric current flowing in response to a zero force applied by the actuator not only stabilises the zero position of the transmitter but also tends to correct the initial friction lag of the meter integrator.

HORST ZIEGLER.

References Cited in the file of this patent

UNITED STATES PATENTS

| Number | Name | Date |
| --- | --- | --- |
| 1,191,416 | Gibson | July 19, 1916 |
| 2,319,363 | Wunsch | May 18, 1943 |

FOREIGN PATENTS

| Number | Country | Date |
| --- | --- | --- |
| 813,898 | Germany | Sept. 17, 1949 |